US010534965B2

(12) United States Patent
Singhal et al.

(10) Patent No.: US 10,534,965 B2
(45) Date of Patent: Jan. 14, 2020

(54) ANALYSIS OF VIDEO CONTENT

(71) Applicant: Amazon Technologies, Inc., Seattle, WA (US)

(72) Inventors: Nitin Singhal, Mercer Island, WA (US); Vivek Bhadauria, Edmond, WA (US); Ranju Das, Seattle, WA (US); Gaurav D. Ghare, Seattle, WA (US); Roman Goldenberg, Haifa (IL); Stephen Gould, Ainslie (AU); Kuang Han, Seattle, WA (US); Jonathan Andrew Hedley, Seattle, WA (US); Gowtham Jeyabalan, Redmond, WA (US); Vasant Manohar, Redmond, WA (US); Andrea Olgiati, Gilroy, CA (US); Stefano Stefani, Issaquah, WA (US); Joseph Patrick Tighe, Seattle, WA (US); Praveen Kumar Udayakumar, Seattle, WA (US); Renjun Zheng, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 44 days.

(21) Appl. No.: 15/926,745

(22) Filed: Mar. 20, 2018

(65) Prior Publication Data
US 2019/0156124 A1 May 23, 2019

Related U.S. Application Data

(60) Provisional application No. 62/590,208, filed on Nov. 22, 2017.

(51) Int. Cl.
G06K 9/00 (2006.01)
G06T 7/00 (2017.01)

(52) U.S. Cl.
CPC ..... *G06K 9/00744* (2013.01); *G06K 9/00228* (2013.01); *G06K 9/00718* (2013.01);
(Continued)

(58) Field of Classification Search
CPC .................. G06K 9/00; H04N 21/00
(Continued)

(56) References Cited

U.S. PATENT DOCUMENTS

2008/0270569 A1* 10/2008 McBride ............ G06K 9/00771
709/217
2016/0171283 A1 6/2016 Masood et al.

OTHER PUBLICATIONS

International Search Report and Written Opinion for Application No. PCT/US2018/061496, dated Feb. 20, 2019, 10 pages.

* cited by examiner

*Primary Examiner* — Abolfazl Tabatabai
(74) *Attorney, Agent, or Firm* — Nicholson De Vos Webster & Elliott, LLP

(57) ABSTRACT

Techniques for analyzing stored video upon a request are described. For example, a method of receiving a first application programming interface (API) request to analyze a stored video, the API request to include a location of the stored video and at least one analysis action to perform on the stored video; accessing the location of the stored video to retrieve the stored video; segmenting the accessed video into chunks; processing each chunk with a chunk processor to perform the at least one analysis action, each chunk processor to utilize at least one machine learning model in performing the at least one analysis action; joining the results of the processing of each chunk to generate a final result; storing the final result; and providing the final result to a requestor in response to a second API request is described.

20 Claims, 17 Drawing Sheets

(52) U.S. Cl.
CPC ............... *G06K 9/00765* (2013.01); *G06K 2009/00738* (2013.01)

(58) Field of Classification Search
USPC ..................................................... 382/103
See application file for complete search history.

ANALYSIS OF VIDEO CONTENT

CROSS-REFERENCE TO RELATED APPLICATIONS

This application claims the benefit of U.S. Provisional Application No. 62/590,208, filed Nov. 22, 2017, which is hereby incorporated by reference.

BACKGROUND

Video is becoming more prevalent in everyday use. For example, stores are opening that solely use video to track purchasers, camera feeds are used to detect license plates, etc. The volume of video is immense and ever changing.

BRIEF DESCRIPTION OF DRAWINGS

Various embodiments in accordance with the present disclosure will be described with reference to the drawings, in which.

DETAILED DESCRIPTION

Figure 1:
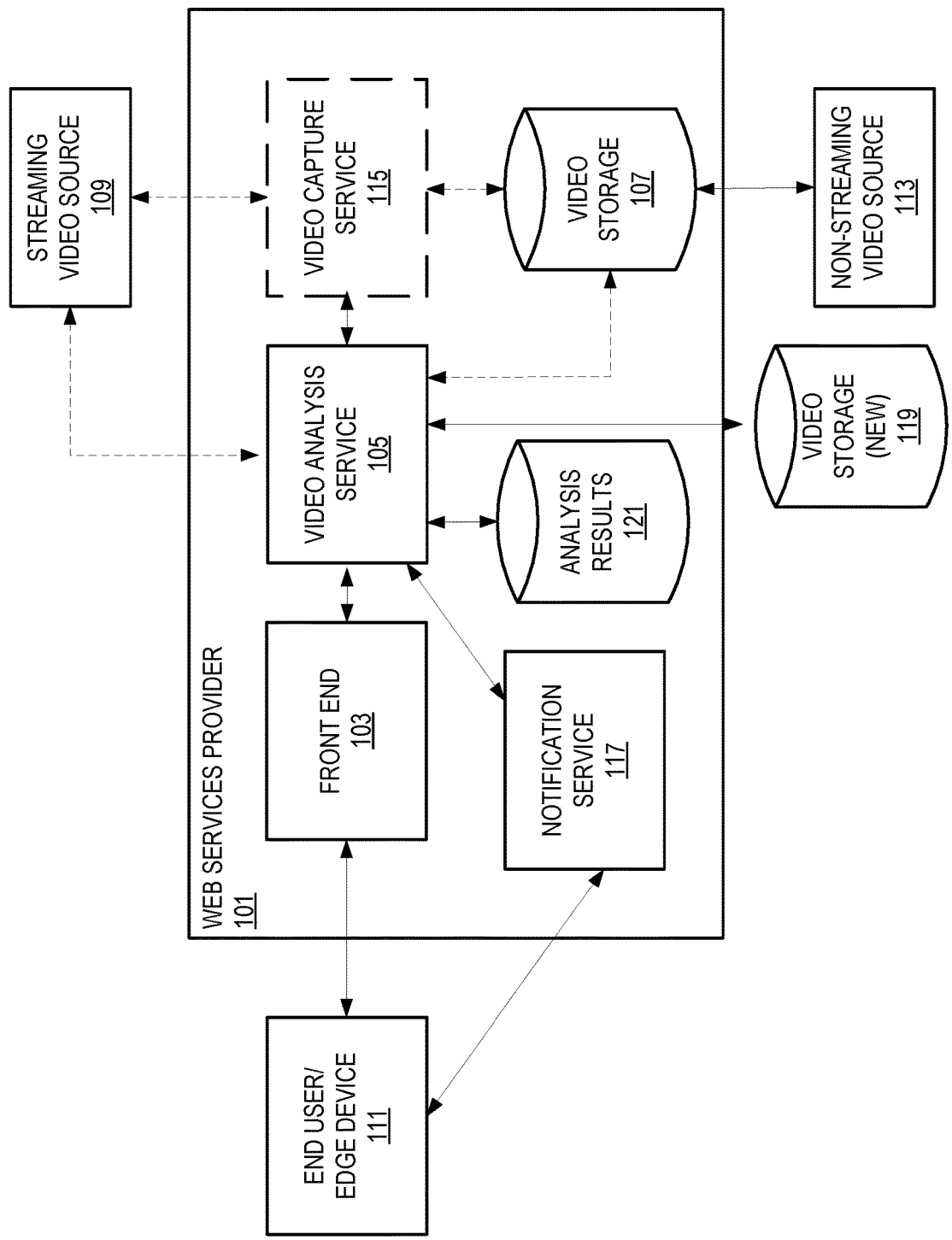
FIG. 1 illustrates embodiments of a web services provider capable of performing video analysis.

Various embodiments of methods, apparatus, systems, and non-transitory computer-readable storage media for video analysis (both archived and streaming) as a web service are described. In some embodiments, application programming interfaces (APIs) for object, face, and/or activity detection in videos are detailed. Video analysis as a web service allows for analytics to be performed on video captured from an end user/edge device. For example, a web camera does not typically have hardware to analyze the video that it captures. Through the offloading of the analytical processing of the video to a web services provider, the video can be analyzed. In some embodiments, this analysis is done in real-time, or near real-time. Additionally, the web services provider allows for the automatic provisioning and elastic scaling of the infrastructure needed to ingest and process streaming video data. Additionally, video streams from the same entity can be analyzed together (for example, tracking a person from camera-to-camera in a store).

Embodiments of a video analysis service capable of working on a large scale, elastic, distributed, and highly available platform offering developers to apply pre-trained ML models including, but not limited to content moderation, object and activity classification, face detection and recognition, person tracking, and celebrity recognition are described. In some embodiments, the web services provider scales to accommodate additional processing elements like optical character recognition (OCR), automatic speech recognition (ASR) and other capabilities.

In some embodiments, the video analysis service uses a microservices style approach for vending video recognition capabilities siloed in video segmenter, processing, and aggregator workers loosely resembling a scatter gather approach to establish effective service level agreements (SLAs) around latency and throughput. In some embodiments, the video analysis service supports both batch oriented and streaming media inputs, and reuses aspects around-key frame selection, containerization of video processing elements, inference service pipelines, and supplemental aspects of authentication & authorization, billing, metrics, and logging. For batch oriented jobs, in some embodiments, the video is fanned out into configurable size chunks that are processed independently. This enables parallel processing within a video, thereby facilitating better end-to-end latencies. At a later step, feature specific aggregation of the individual chunk results through parametric smoothing both spatially and temporally. The video analysis service is tolerant to failures (for example, failures of underlying hardware or service failures), and, in some embodiments, is able to restart the processing of a batch or a streaming job from the last known good checkpointed state. In some embodiments, the video analysis service has an integrated notification component to send messages that track how the job is being handled including scheduling events, any partial failures, lag build ups, etc.

FIG. 1 illustrates embodiments of a web services provider capable of performing video analysis. An end user/edge device 111 communicates with the web services provider 101 to start video analysis and/or get results of the video analysis. The communications are in the form of application programming interface (API) calls in some embodiments.

The web services provider 101 includes several different components. Each of these components is software store in memory and executed by a processor in some embodiments. The particular hardware used for most of the components may be user selected. For example, the video analysis service 105 may perform better on application specific hardware, or using an accelerator as opposed to a general purpose central processor. In other embodiments, one or more of the components are determined by the web services provider based on requirements of the end user (such as latency, cost, etc.).

A front end 103 receives the communications from the end user/edge device 111. In some embodiments, the front end 103 forwards the communications to video analysis service 105 to start video analysis and/or get results of the video analysis. In other embodiments, the front end 103 translates the communications into a format the video analysis service 105 understands to cause the video analysis service 105 to start video analysis and/or get results of the video analysis.

The video analysis service 105 analyzes video. In some embodiments, the video analysis service 105 performs at least one or more of person tracking, face detection, label detection, celebrity recognition, content moderation, and/or searching as directed by the end user/edge device 111.

The video may be streaming (dynamic) from a streaming video source 109 or stored (static) in video storage 107 either from a streaming video source 109, or from a non-streaming video source 113. In some embodiments, video stored in video storage 107 is encrypted and is protected from unauthorized access. Additionally, in some embodiments, video is externally stored in video storage 119.

In some embodiments, a streaming video source 109 provides the streaming video directly to the video analysis service 105. In other embodiments, a streaming video source 109 provides the streaming video to a video capture service 115 which makes the streaming video accessible to the video analysis service 105. In some cases, the video capture service 115 stores the streaming video in video storage 107 (making the stream static). In some embodiments, the video capture service 115 securely connects to the streaming video source 109 and encrypts and indexes video it receives. As detailed above, video storage 107 may also receive video from a non-streaming video source 113. For example, an H.264 file is uploaded to the video storage.

Results of any analysis performed by the video analysis service 105 are stored as analysis results 121. In some embodiments, the analysis results 121 are accessible via the front end 103. In some embodiments, the analysis results 121 are accessible more directly.

In some embodiments, video analysis service 105 provides a notification of completion to a notification service 117 which the informs the requesting user/device 111 that results are available.

Figure 2:
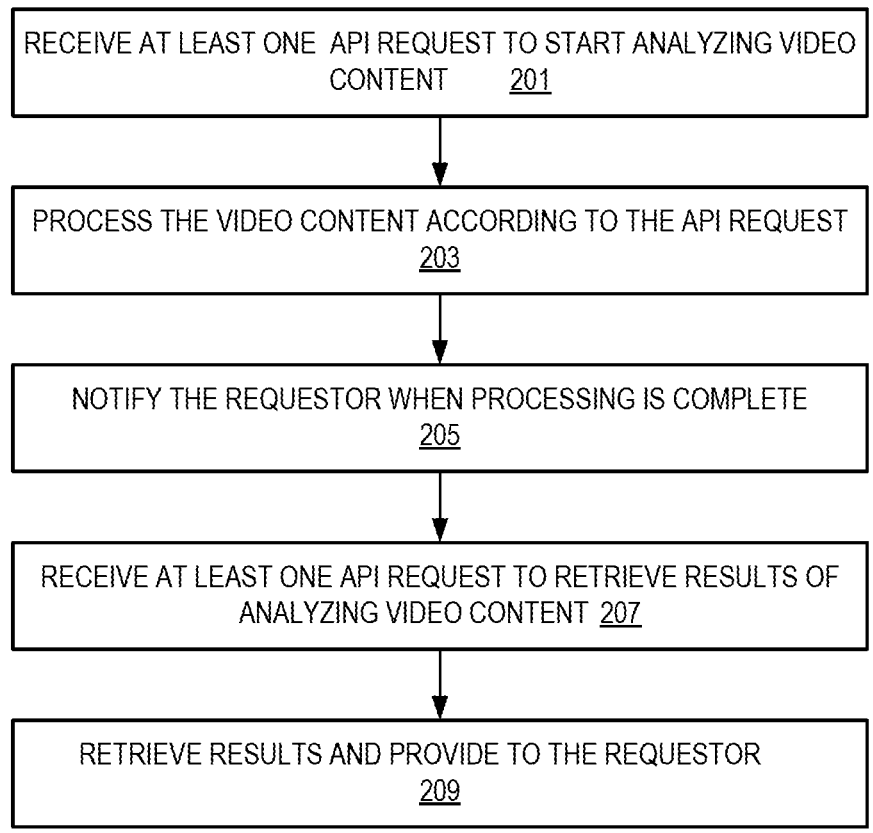
FIG. 2 illustrates embodiments of a method.

FIG. 2 illustrates embodiments of a method. In some embodiments, the method is performed by a video analysis service. In some embodiments, the requests discussed below are received at a front end of a web services provider. At 201, one or more API requests to start analyzing video content are received. Examples of API requests include, but are not limited to: start content moderation, start face detection, start label detection, start person tracking, start celebrity recognition, create stream processor, and start stream processor. Note that multiple API requests may be submitted at one time in some embodiments.

A start content moderation request starts detection of explicit or suggestive adult content in a video. The location of the video (such as storage location or stream) is provided in the request. In some embodiments, the request includes a location or means for reporting a notification using a job tag of the request when the detection is complete. A job tag is provided to identify the job. A job identifier is provided by the video analysis service and is used to find the results of the content detection.

A start face detection request starts detection o faces in a video. The location of the video (such as storage location or stream) is provided in the request. In some embodiments, the request includes a location or means for reporting a notification using a job tag of the request when the detection is complete. A job identifier is provided by the video analysis service is used to find the results of the face detection. Results of the person tracking may include labels of faces and names if the face has previously been labeled. Further, in some embodiments, the request includes the face attributes that are to be returned (such as bounding box, confidence, pose, quality, and landmarks).

A start person tracking request starts detection of people in a video. The location of the video (such as storage location or stream) is provided in the request. In some embodiments, the request includes a location or means for reporting a notification using a job tag of the request when the label detection is complete. Results of the person tracking may include labels of people and names if the person has previously been labeled. A job identifier is provided by the video analysis service and that identifier is used to find the results of the person tracking.

A start label tracking request starts detection of labels in a video. Labels are instances of real-world entities and include objects like flower, tree, and table; events like wedding, graduation, and birthday party; concepts like landscape, evening, and nature; and activities like a person getting out of a car or a person skiing. The location of the video (such as storage location or stream) is provided in the request. In some embodiments, the request includes a location or means for reporting a notification using a job tag of the request when the label detection is complete. A job identifier is provided by the video analysis service and is used to find the results of the label tracking.

A start celebrity recognition request starts celebrity detection in a video. The location of the video (such as storage location or stream) is provided in the request. In some embodiments, the request includes a location or means for reporting a notification using a job tag of the request when the label detection is complete. Results of the celebrity tracking may include labels of people in the video. The video analysis service can the use the label to determine who the celebrity is (for example, upon request). A job identifier is provided by the video analysis service and is used to find the results of the celebrity recognition.

In some embodiments, a stream processor is created and then started before the above requests can be run.

The video content is processed according to the API request and the results stored at 203. Exemplary specifics of how processing occurs are detailed later.

At 205, the requestor is notified once the processing is complete. For example, a notification service alerts the requester that a particular job is complete.

At some later point in time, at least one API request is received to retrieve results of analyzing the video content at 207. Examples of API requests include, but are not limited to: get content moderation, get face detection, get label detection, get person tracking, get celebrities, etc. Note that multiple API requests may be submitted at one time in some embodiments. Each "get" request includes the job identifier from the corresponding "start" request.

The results are retrieved based on the job identifier(s) and provided to the requestor at 209.

Figure 3:
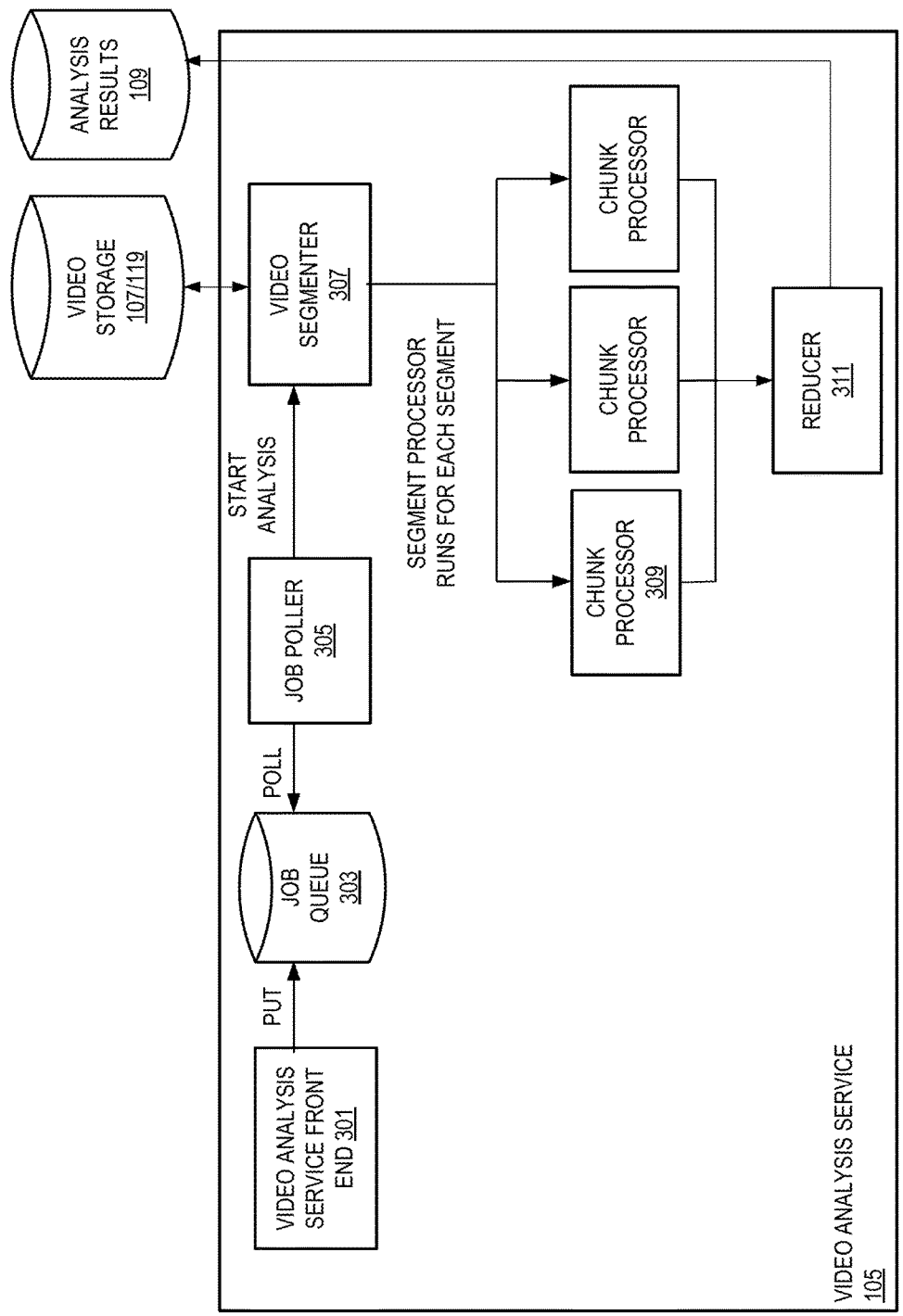
FIG. 3 illustrates embodiments of a video analysis service for archived video.

FIG. 3 illustrates embodiments of a video analysis service for archived video. A request to analyze a video stream is received by a video analysis service front end 301. The request is typically received via an API call as detailed above.

The video analysis service front end 301 puts the request as a job in a job queue 303 to be processed at a later point. In some embodiments, the video analysis service front end 301 returns state of the jobs to the API consumer. In some embodiments, the front end 301 validates credentials, gets metadata of the object to validate size, and generates a temporary link that is used for inputting the content into the video segmenter 307.

A job manager/poller 305 polls the job queue 303 for a job and provides the job to a video segmenter 307 to start the analysis. In some embodiments, the job poller 305 is a library that uses an underlying data store for keeping track of user submitted jobs and ensuring fair-share of service processing bandwidth. In some embodiments, minutes of video to be analyzed per second is the measure of a user's bandwidth. In some embodiments, the job manager 305 is responsible for one or more of: tracking status of individual jobs; bounding number of jobs in pending state for a user; job prioritization; aging; and support using facing visibility APIs such as getting status of a job and getting all user submitted jobs within a time frame.

The video segmenter 307 accesses a data storage 107/119 (e.g., a database) storing video. In some embodiments, the video segmenter 307 segments a video into smaller chunks that can be processed independently to optimize for throughput and latency. In some embodiments, a secondary role is extracting metadata for the video (for example, duration, bitrate, frames per second, etc.). For overlapping video segments, some of the processing elements (like activity detection) may require overlapping video segments. Creating video for each segment and uploading them versus storing segment start and end byte reference within the video and using byte range based access may optimize uploads. The video segmenter 307 also determines a size of each segment.

The video segmenter 307 feeds one or more of the chunks to chunk processors 309. The chunk processors 309 run all the aspects of video content analysis that includes object and face detection on the frames extracted from chunks in some embodiments. In some embodiments, the chunk processors 309 are containerized and would make a call to the processing service for getting label detection, face detection, face feature extraction and activity classification. In some embodiments, intermediary results are persisted back, along with the frame information for the reduce phase.

In some embodiments, each processing unit in a chunk processor 309 defines the contract for: input, output, error and exceptions, and run time footprint and resources required. The chunk processor 309 may also perform a choreography of unit workers (for example, frame based analysis, activity detection, tracking, etc.) to pass derivatives of one step into another unit.

In some embodiments, a reducer/aggregator 311 gathers the results of the chunk processors 309 (e.g., from the frame based detection) and applies a join on the information and stores the result in analysis results 121.

In some embodiments, the video segmenter 307, each chunk processor 309, and the reducer 311 are containers and include models for label detection, face detection, face feature extraction and activity classification models as needed. In other embodiments, the video segmenter 307, each chunk processor 309, and the reducer 311 are virtual machines and call for label detection, face detection, face feature extraction and activity classification models as needed.

Figure 4:
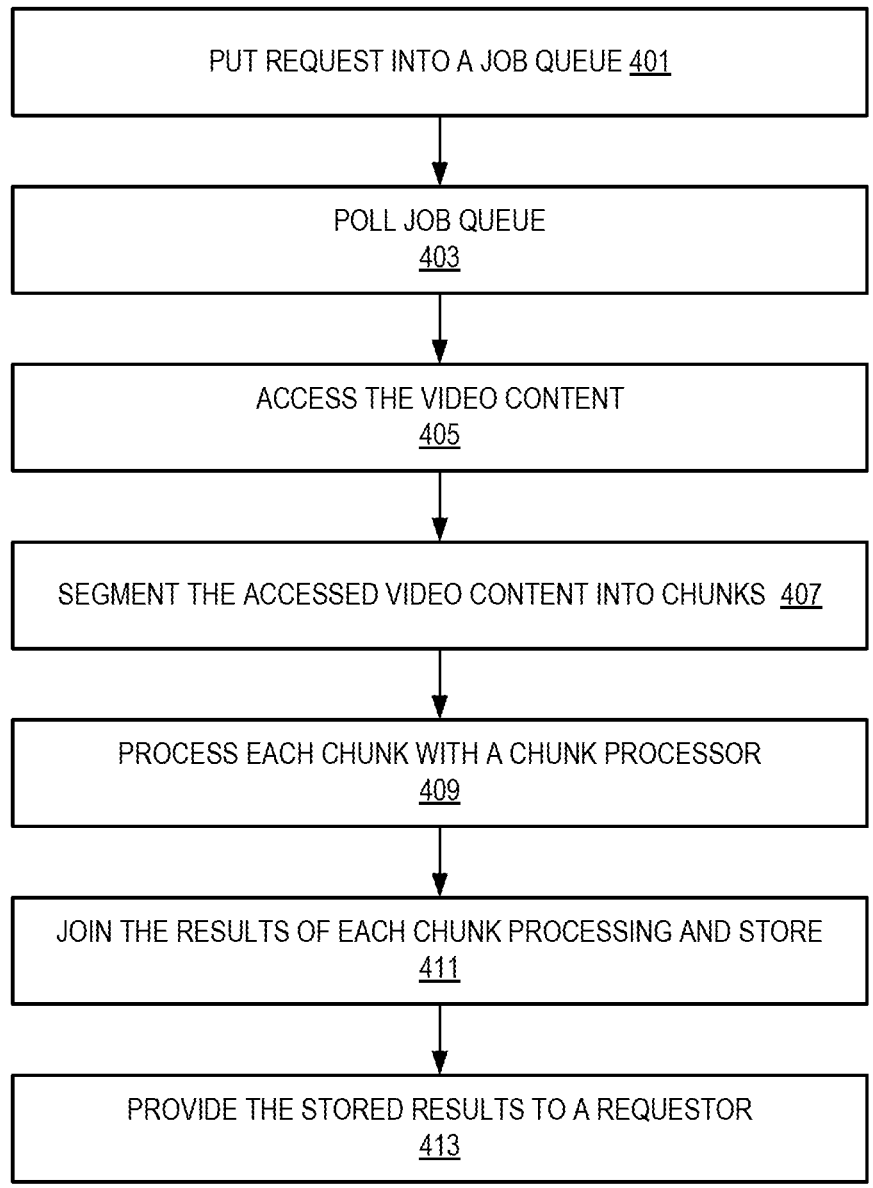
FIG. 4 illustrates embodiments of a method of stored video analysis. At 401, a request in put into a job queue in some embodiments.

FIG. 4 illustrates embodiments of a method of stored video analysis. At 401, a request in put into a job queue in some embodiments. For example, a start face recognition request is placed into a job queue. In some embodiments, a job ID is given to the requestor to use for retrieval of the results of the stored video analysis.

At 403, as resources free, the job queue is polled for a job. Using the start face recognition request job as a continuing example, this job is retrieved.

The video content associated with the retrieved job is accessed at 405. For example, the video file in a database that face recognition is requested to be run on.

The accessed video is segmented into chunks at 407. In some embodiments, the size of the chunks is determined by a front end of the video analysis service. Chunks are one or more frames.

At 409, each chunk is processed with a chunk processor. The results of each chunk processing are joined to form a final result at 411 and stored for retrieval. In some embodiments, a notification to the requestor is also made.

At 413, the stored results are provided to the requestor in response to a "get" API request.

Figure 5:
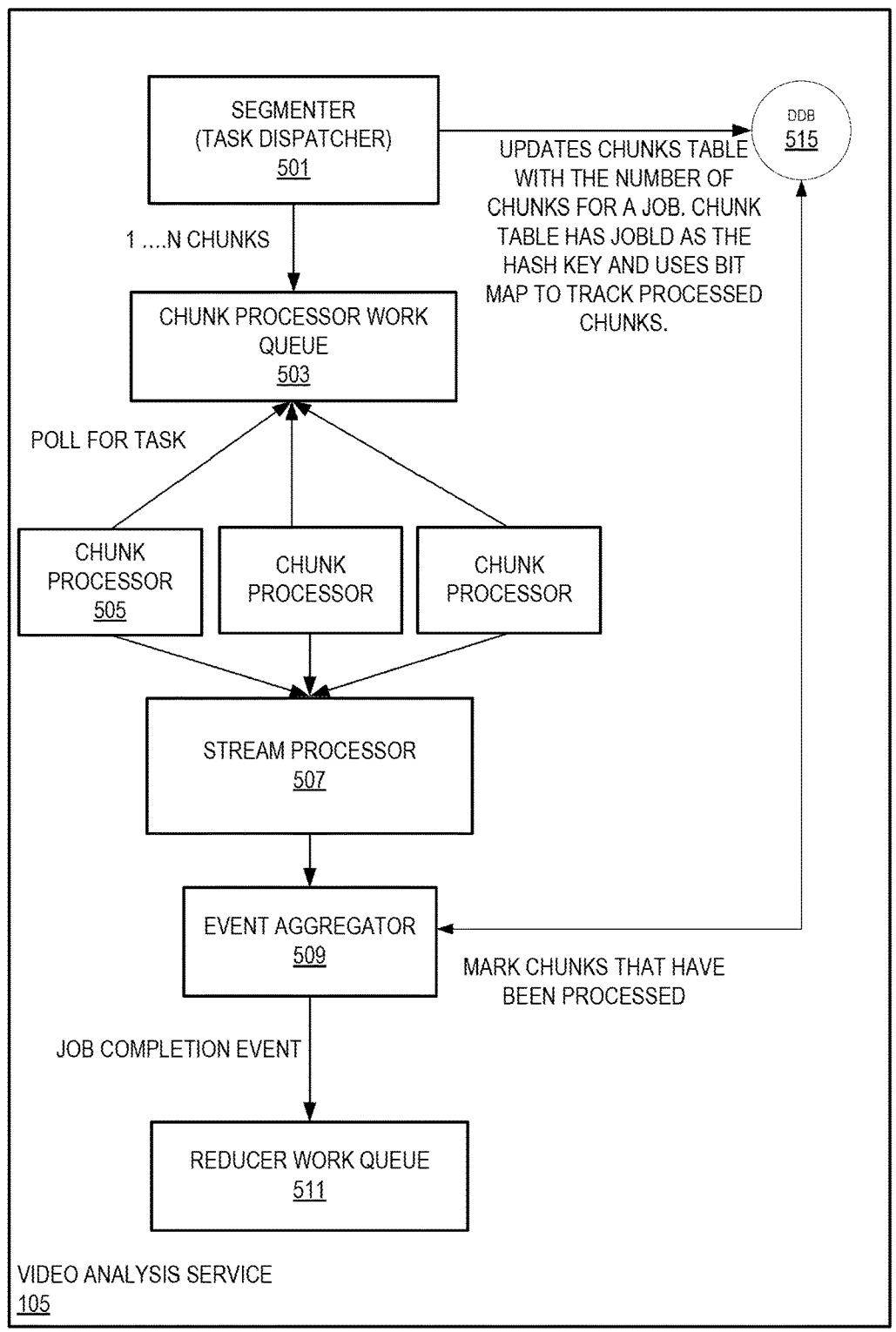
FIG. 5 illustrates aspects of embodiments of a video processing (analysis) architecture for video.

FIG. 5 illustrates aspects of embodiments of a video processing (analysis) architecture for video. In this example, the video analysis service front end is not shown. In some embodiments, a job queue and poller are also utilized as detailed above. The video segmenter 501 accesses a data storage 515 (e.g., a database) with video (such as storage 107) and/or a chunk table. The segmenter 501 updates a chunks table with the number of chunks for a job. The chunk table has a job id as a hash key and uses a bit map to track processed chunks in some embodiments.

In some embodiments, the segmenter 501 and/or work queue 503 is responsible for dispatching segments to chunk processors, keeping track of processed chunks, and a notifying reducer 509 once all segments for a job are complete.

Chunk processors 505 operate as detailed above. In some embodiments, after processing a chunk, a chunk processor 505 publishes to a stream processor 507 using the job id as the partition key. A partition key is used to group data by shard within a stream. Each consumer reads from a particular shard, this means that same shard processor will handle all chunk completion events for a given job. This helps ensure consistency while updating job state. Further, in some embodiments, reads are batched.

In some embodiments, a reducer/aggregator 509 gathers the results of the chunk processors 505 and applies a join on the information. The reducer/aggregator 509 marks chunks that have been processed in a database 515. A job completion event is sent to a reducer work queue 511 upon the completion of a job.

Figure 6:
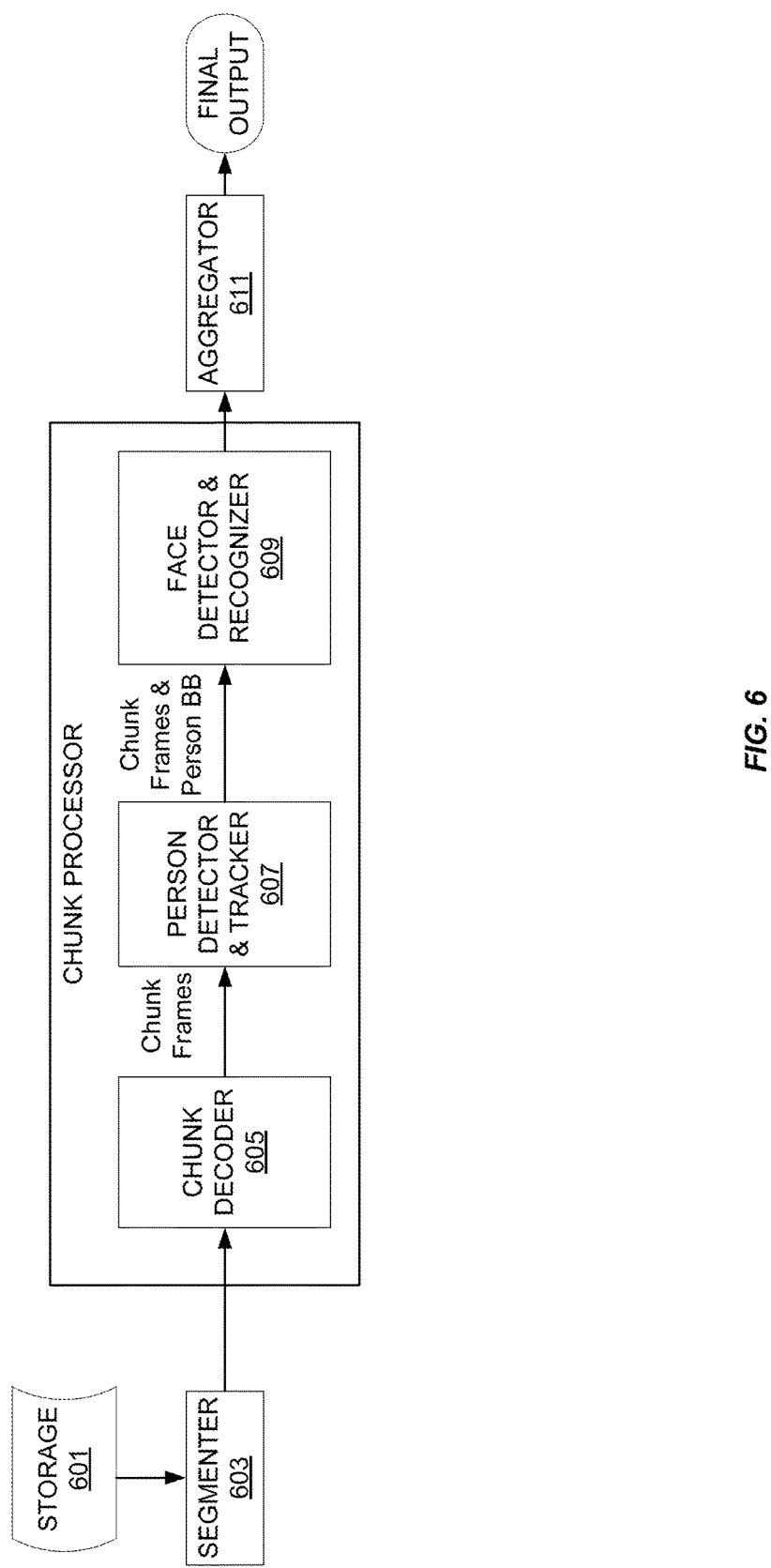
FIG. 6 illustrates embodiments of data flow between components according to some embodiments.

FIG. 6 illustrates embodiments of data flow between components according to some embodiments. Storage 601 stores video content. Segmenter 603 accesses the video of the storage 601 and provides chunks to the chunk processor (such as those detailed above).

The chunk processor's decoder 605 receives and decodes each chunk into chunk frames. The chunk frames are provided to a person detector and tracker 607 in some embodiments. For example, when person detection and tracking is requested the person detector and tracker 607 analyzes the chunks to find people and track them across frames. In some embodiments, the person detector and tracker 607 analyzes the chunks and outputs tracklets on a per frame resolution.

In some embodiments, this data is fed along with sampled frames (such as 10% of the original frames) to the face detector and extractor 609 which proposes a face match to the person (including celebrities).

In some embodiments, an aggregator 611 processes per chunk output to produce the results over the entire video that includes a per frame person bounding box, face bounding box (in sampled frames), and face matches as requested. In some embodiments, the aggregator 611 performs the match between faces and people (including celebrities).

The person detector and tracker 607, face detector and extractor 609, and aggregator 611 of the chunk processor are machine learning models executing in a virtual machine in some embodiments. The person detector and tracker 607, face detector and extractor 609, and aggregator 611 of the chunk processor are machine learning models that are a part of a container in some embodiments.

Figure 7:
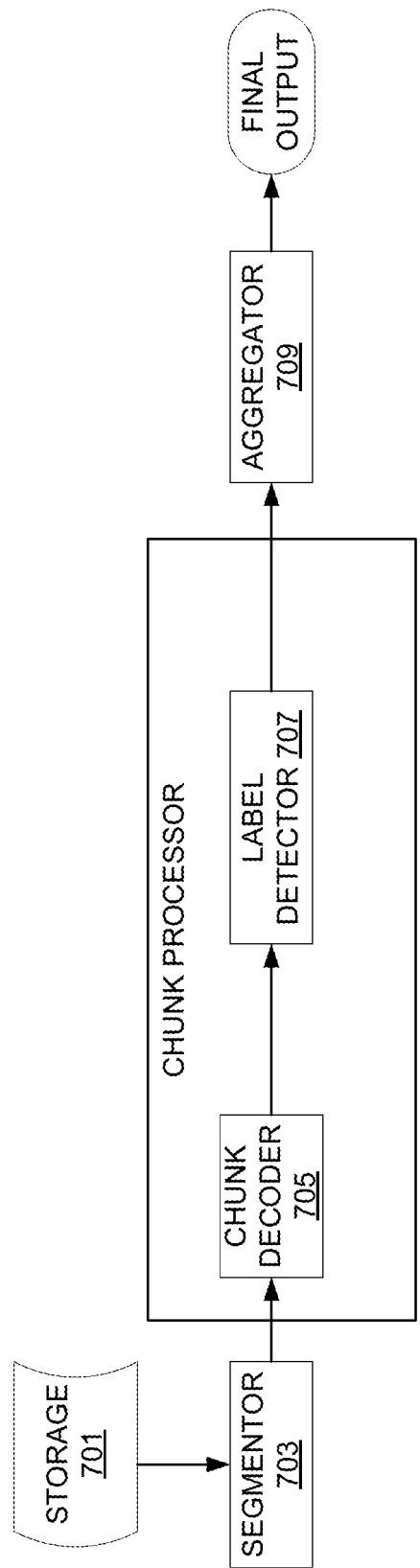
FIG. 7 illustrates embodiments of data flow between components according to some embodiments.

FIG. 7 illustrates embodiments of data flow between components according to some embodiments. Storage 701 stores video content. Segmenter 703 accesses the video of the storage 701 and provides chunks to the chunk processor.

The chunk processor's decoder 705 receives and decodes each chunk into chunk frames. The chunk frames are provided to a label detector 707 in some embodiments. In some embodiments, processes the chunks and outputs labels on a per frame resolution.

In some embodiments, an aggregator 709 processes per chunk output, to produce the results over the whole video that includes a per sampled frame label matches.

The label detector 707 of the chunk processor is a machine learning model executing in a virtual machine in some embodiments. The label detector 707 of the chunk processor is a machine learning model that is a part of a container in some embodiments.

In some embodiments, the workflow orchestration is decoupled from activity logic. In these embodiments, the video segmenters, chunk processors, and reducers detailed above are activities. Each activity implements a defined interface and is agnostic to activities up/below the chain. Further, these activities are idempotent and do not carry knowledge of workflow state. An activity is concerned with how to implement its contract and stays agnostic to workflow orchestration.

In some embodiments, each activity is associated with a work queue. Activity is wrapped around a work queue client that polls this work queue and invokes activity when it receives a task.

In some embodiments, job orchestration is decentralized and each activity worker depends on the orchestrator package. The orchestrator picks up the task event, validates state, performs transformation and deserialization before invoking a task. Every activity exposes an invocation contract that specifies the input work queue, output work queue, timeout and retry policies. Post activity invocation, orchestrator looks up the job definition to figure out next task to execute and update the workflow state.

Figure 8:
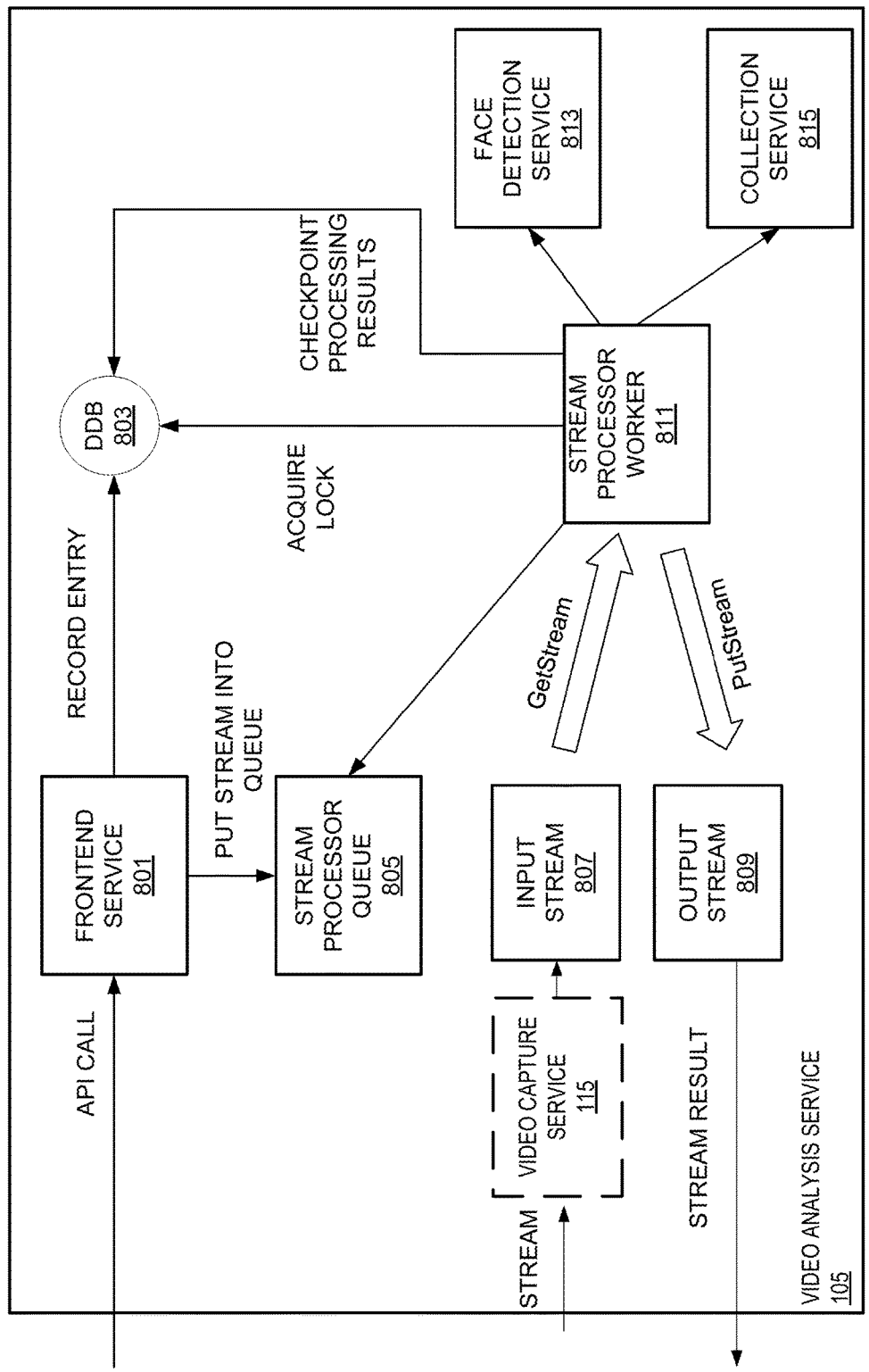
FIG. 8 illustrates embodiments of a video analysis service for streaming video processing.

FIG. 8 illustrates embodiments of a video analysis service for streaming video processing. A frontend service 801 receives API requests (such as those described above).

The frontend service 801 records entries in a database 803. The database 803 is used to track stream processing status such as which worker has acquired lock to process the stream, what is the last successfully processed fragment number, etc. In some embodiments, workers will asynchronously try to acquire lock to pick up and process a stream. In some embodiments, workers will send regular heartbeats to signal that they are actively processing a particular stream. This will help us with process stream in a fault tolerant way. If one worker dies, another worker will acquire the lock and start processing the stream.

In some embodiments, the frontend service 801 puts stream requests to a queue for stream processing 805. The queue 805 helps the workers to get a task instead of scanning the entire database to pick up one.

A stream processor worker 811 accesses the database 803 and acquires a lock for a stream request, picks up work from the queue 805, consumes the video stream 807 (in some embodiments that has been passed through a video capture service 115), and processes it by calling the services 813 and 815, and checkpoints results in some embodiments. The services 813 and 815 are face detection and collection services respectively. In some embodiments, the worker 811 and services 813 and 815 are virtual machines executing a machine learning model. In other embodiments, the worker 811 and services 813 and 815 are containers executing a machine learning model.

An output stream 809 is sent to an endpoint to which the results of the video processing are provided (analysis results 121).

In most embodiments, the architecture is an asynchronous worker based system where workers process the live stream, apply image processing capabilities to it, and give back the stream results. The stream processor regularly checkpoints the results of processing to the database 803 in some embodiments. When a worker fails to heartbeat (deployments/failures, etc.), another worker picks up the request from the queue, acquires the database lock and starts processing the stream from the previous checkpoint.

An exemplary schema for the database 803 is

```
{
    "Jobid": "<GUID>",
    "AccountId": "AccountId",
    "RawRequest": "JSON request for the Start stream rekognition",
    "LastActionRequestedOnStream" : "START/STOP"
    "StreamingStatus":
    "PENDING/RUNNING/STOPPED/EXPIRED/FAILED",
    "SubmissionTime": "Submission time epoch",
    "LeaseOwner": "Worker that owns the lease",
    "LeaseVersion": "GUID",
    "LeaseDuration": "Time to hold the lease",
    "LeaseState": "LEASED/AVAILABLE",
    "OwnerSwitchesSinceLastCheckpoint": "Number of lease owner switches since last checkpoint",
    "CheckPointInfo": {
        "lastProcessedFragmentNumber": "last processed fragment"
    }
}
```

A stream processor worker 811 is responsible for processing an input video stream and producing output metadata. In some embodiments, a stream processor has four components: 1) stream consumer; 2) frame extraction; 3) frame processor; and 4) metadata output producer. Each of these components is made of one or more machine learning models in some embodiments. In some embodiments, each of these components is a container. In some embodiments, each of these components is a virtual machine.

In some embodiments, once a stream processor worker 811 is allotted to an input stream, the worker initializes a stream consumer to read from the stream. In some embodiment, the stream consumer whether there is any checkpoint data for the stream. The stream processor consumer calls the frame extraction server for streaming in the video data. In some embodiments, the stream consumer is responsible for handling throttling to keep up with the frame extraction/processing and output production.

The frame extraction component may be built in several ways. In some embodiments, a library is built for extracting the frames and making calls to start/stop the extraction. In some embodiments, a service is used for extracting the frames and making service calls to start/stop the extraction. In some embodiments, an executable for extracting frames is used.

In some embodiments, the frame extraction component is run as a separate server run in the same host for each worker. The frame extraction component is responsible for decoding the video input and extracting frames at a certain frames per second (FPS) speed. In some embodiments, during a call for a stream, it returns two ports (p1, p2) as acknowledgement where the first port is for streaming in the video and the second port is for streaming the frames out. After this, the consumer will open an output socket to p1 and the frame extractor will open an input socket to p1.

The frame processor responsible for processing the image frames and giving out the person identities at 1 FPS, grouped by fragment number, in some embodiments. The frame extraction is done at a higher frame rate than 1 FPS (say @10 FPS). In some embodiments, these frames are used for face tracking to ensure quality and optimize the number of search face calls to the collection from the frame processor module to maintain a list of current faces in the scene and invoke a search face service call when there is a new face entering the field of view.

Figure 9:
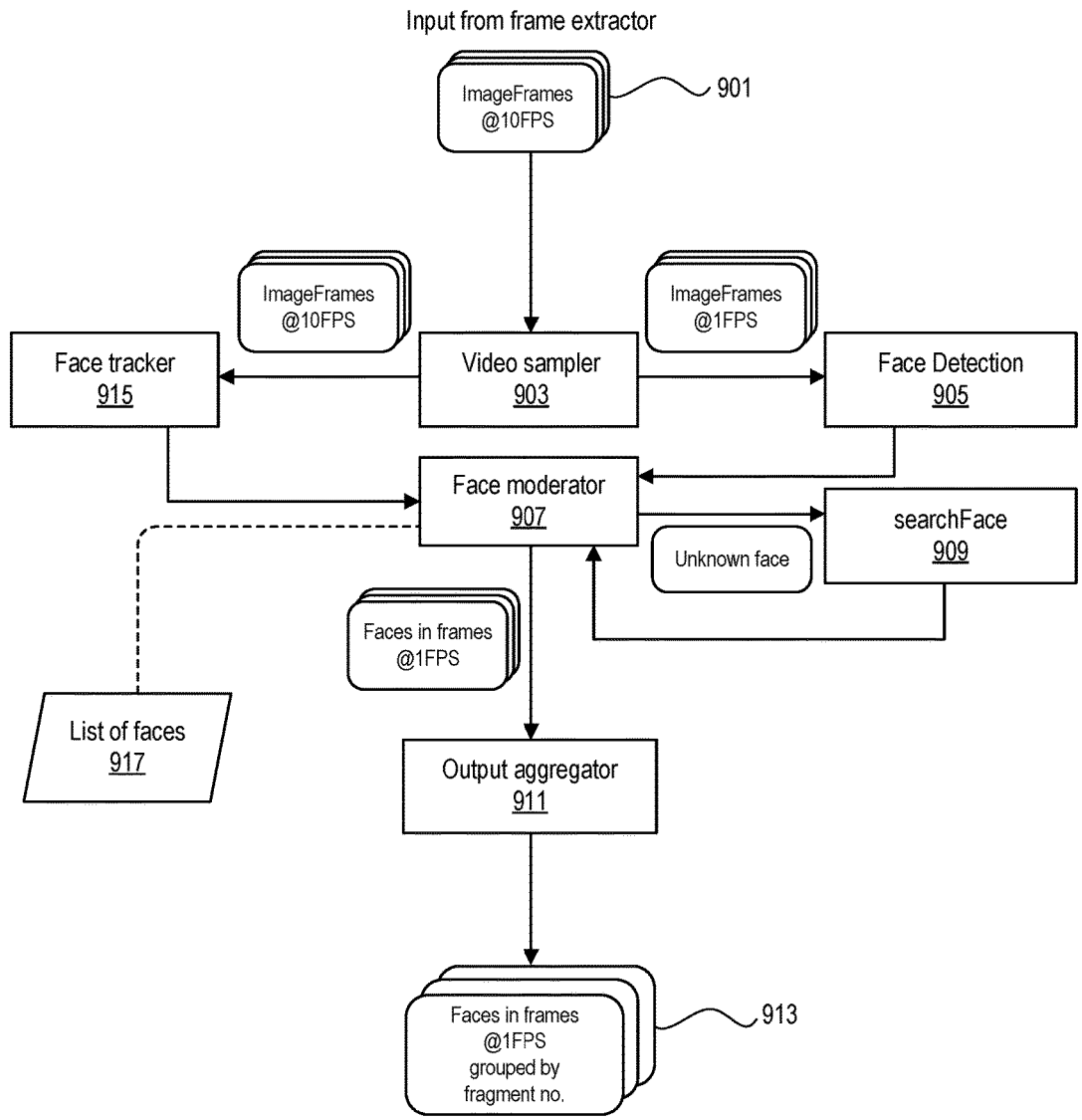
FIG. 9 illustrates embodiments of a frame processor.

FIG. 9 illustrates embodiments of a frame processor. Input from the frame extractor is received at 901. For example, image frames at 10 FPS. A video sampler 903 selects the best frames from the input and outputs to a face detection module 905. Typically, the rate of frames input to the face detection module 905 is less than the input.

The face detection module 905 sends a list of faces detected to the face moderation 907. In some embodiments, the face moderator 907 makes a call to a search face module 909 to search for any unknown faces and those results are returned to the face moderator 907.

In some embodiments, the face moderator 907 sends an indication of faces in frames at the lower FPS to an output aggregator 911 which generates and output of faces in the frames grouped by fragment number 913.

In some embodiments, sends image frames to a face tracker module 915 which returns a list of faces tracked to the face moderator 907. In some embodiments, face moderator 907 outputs that list 917.

In some embodiments, the metadata output component is responsible for writing the output per fragment into the output stream and checkpointing the fragment number. In some embodiments, this component goes through each item in the queue sent from frame processor, get the results (which is grouped by fragment number) and writes it out. In some embodiments, if the request times out, the failure is abstracted into meaningful message and produced as output. When the producer's call fails or timeout even after a retry strategy, the output stream is considered bad and the stream processing is terminated and the status is updated in the database 803 accordingly. If the output is produced successfully for a fragment, the fragment number along with necessary data is checkpointed.

Figure 10:
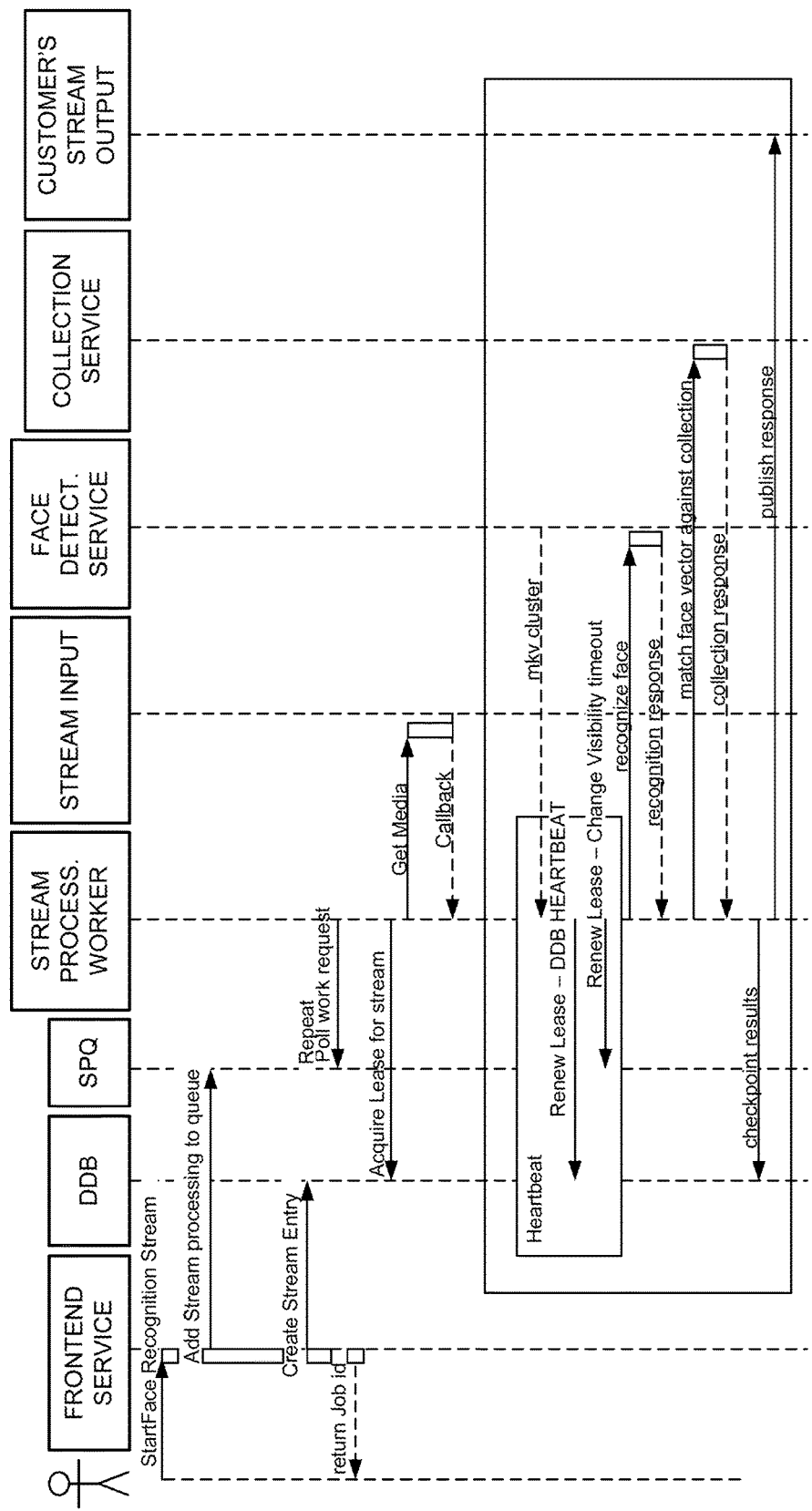
FIG. 10 illustrates a sequence diagram (method flow) for start face recognition for a video stream according so some embodiments.

FIG. 10 illustrates a sequence diagram (method flow) for start face recognition for a video stream according so some embodiments. An API request for start face recognition is received by the frontend service 801.

The frontend service adds job to the stream processing queue (SPQ) 805, creates a record entry in database 803, and returns a job id to the requester.

At some point in time, a stream processor worker 811 polls the SPQ 805 for work and once it gets the job acquires a lease for the stream from the database 803.

The stream processor worker 811 then accesses the input stream 807 and begins looking for faces by calling the face detection service 813. During processing, in some embodiments, there is a heartbeat check to the database 803 and SPQ 805.

For each "face" detected by the stream processor worker 811, the face detection service 813 determines if there is a face or not and provides a recognition response back to the stream processor worker 811.

The "face" is then matched against a collection of faces by the collection service 815 which provides a "who" to the face. As each person is recognized, the resulting detection is checkpointed by the stream processor worker 811 to the database 803.

Finally, when the video has been analyzed fully, a response is published to an output stream 809 by the stream processor worker 811.

Figure 11:
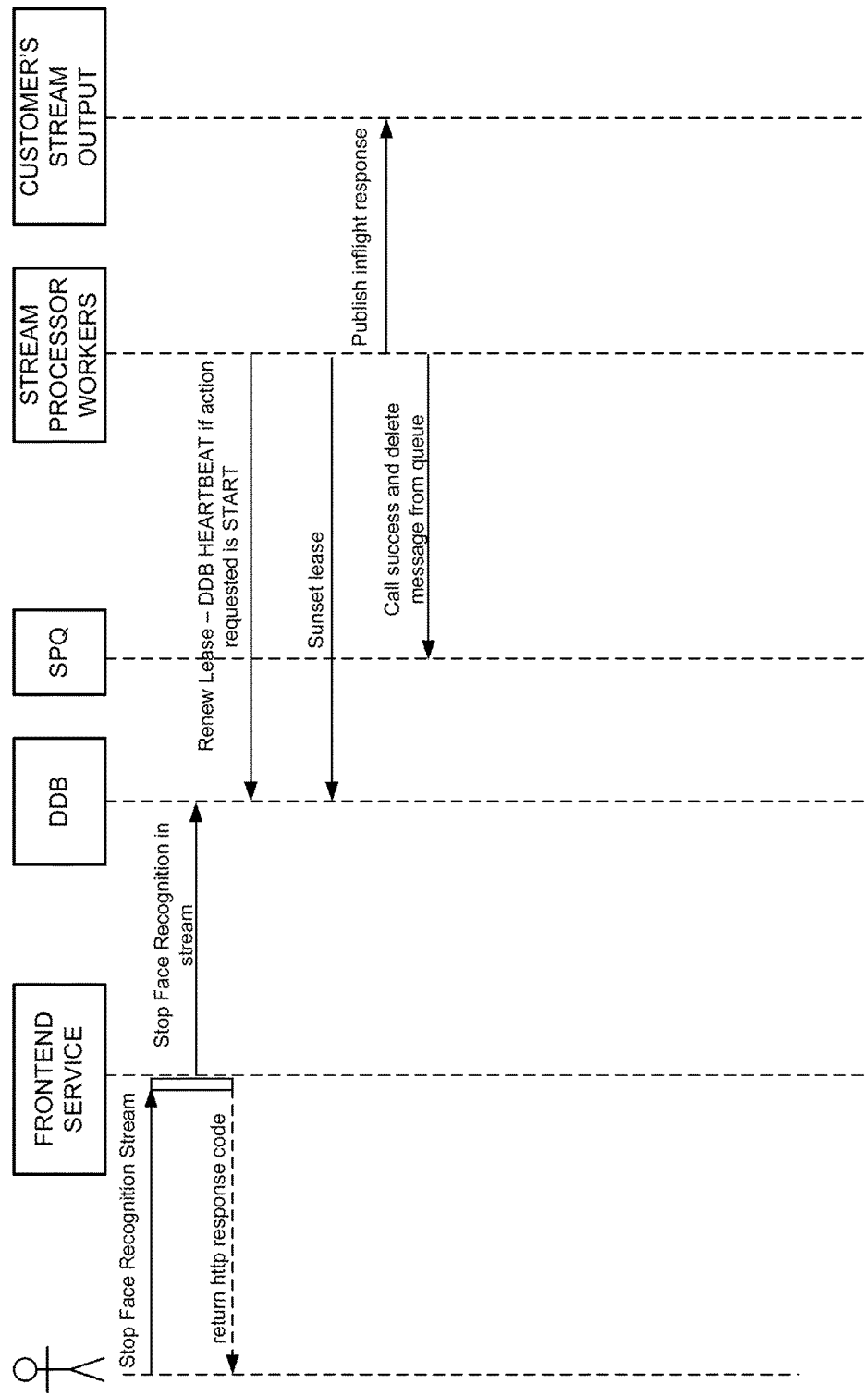
FIG. 11 illustrates a sequence diagram (method flow) for stop face recognition for a video stream according so some embodiments.

FIG. 11 illustrates a sequence diagram (method flow) for stop face recognition for a video stream according so some embodiments. An API request for stop face recognition is received by the frontend service 801.

The frontend service tells the database 803 that face recognition is stopping and returns a response to the requester that the service has stopped.

A stream processor worker 811 sunsets its lease with the database 803 and publishes any in flight result to the output stream 809. The stream processor worker 811 then deletes the request from the SPQ.

Figure 12:
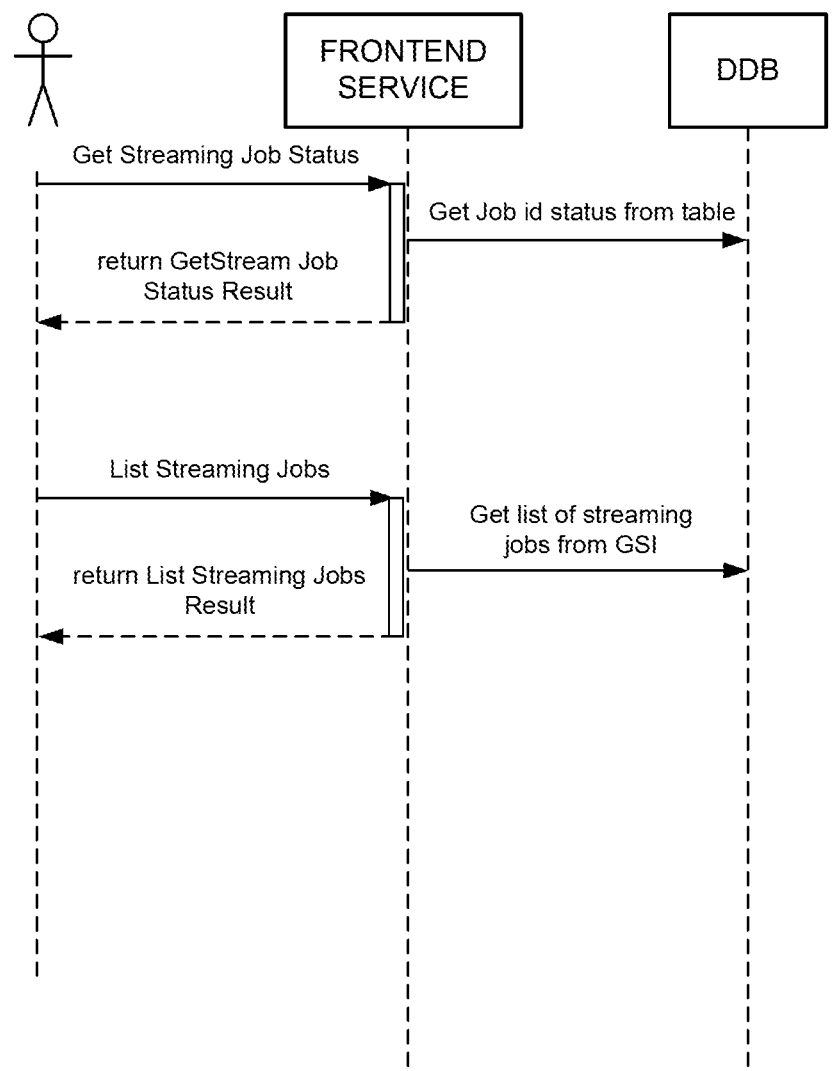
FIG. 12 illustrates a sequence diagram (method flow) for getting streaming job status for a video stream according so some embodiments.

FIG. 12 illustrates a sequence diagram (method flow) for getting streaming job status for a video stream according so some embodiments. An API request for streaming job status is received by the frontend service 801.

The frontend service 801 accesses the database 803 using the job id provided by the API request and returns the status to the requester. Similarly, a list of streaming jobs may be provided to a user.

Figure 13:
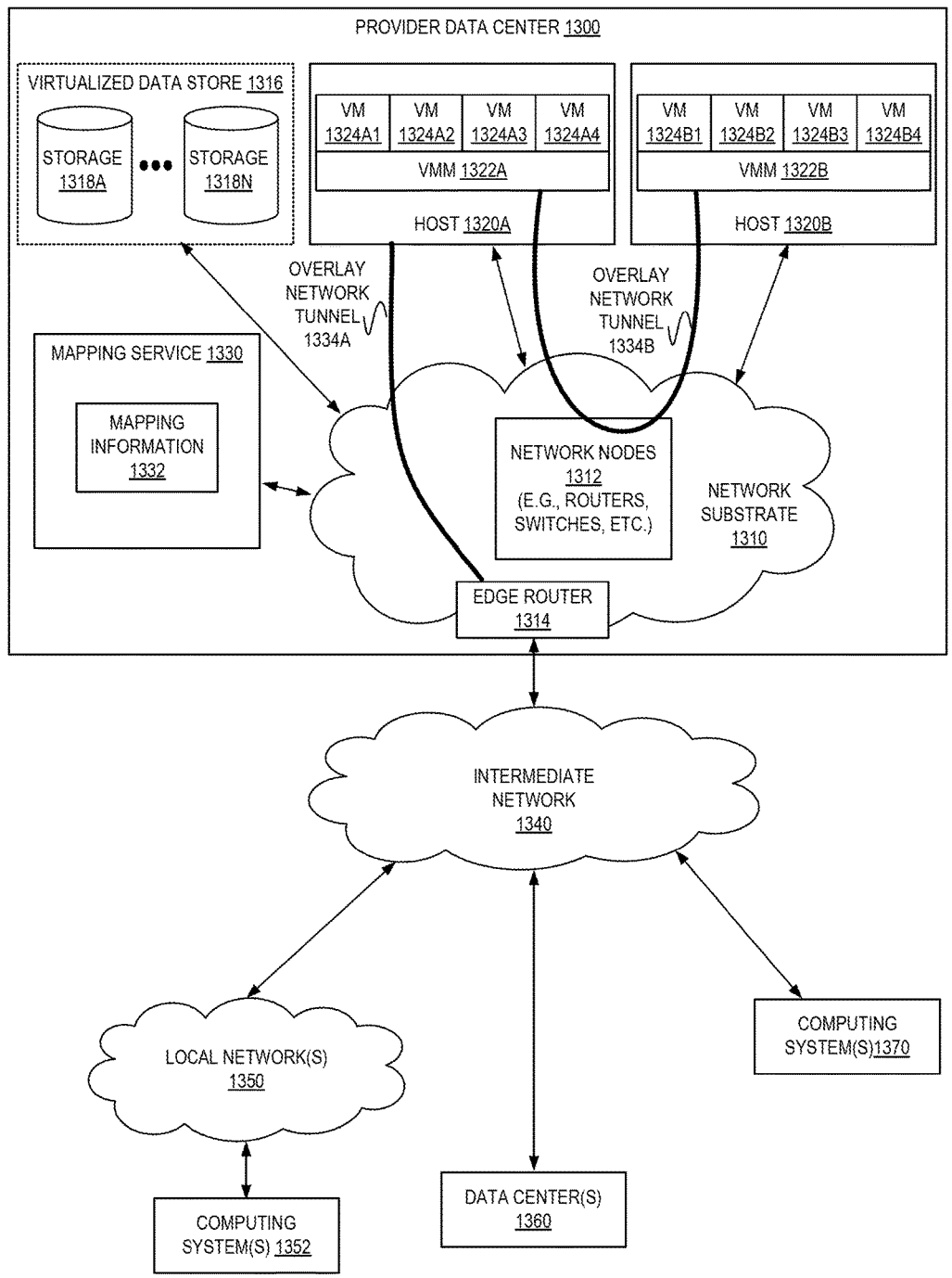
FIG. 13 illustrates an example data center that implements an overlay network on a network substrate using IP tunneling technology according to some embodiments.

FIG. 13 illustrates an example data center that implements an overlay network on a network substrate using IP tunneling technology, according to some embodiments. A provider data center 1300 may include a network substrate that includes networking nodes 1312 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1310 using tunnels. The IP tunneling technology may provide a mapping and encapsulating system for creating an overlay network on a network (e.g., a local network in data center 1300 of FIG. 13) and may provide a separate namespace for the overlay layer (the public IP addresses) and the network substrate 1310 layer (the local IP addresses). Packets in the overlay layer may be checked against a mapping directory (e.g., provided by mapping service 1330) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1330) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 13, an example overlay network tunnel 1334A from a virtual machine (VM) 1324A (of VMs 1324A1-1324A4, via VMM 1322A) on host 1320A to a device on the intermediate network 1350 and an example overlay network tunnel 1334B between a VM 1324A (of VMs 1324A1-1324A4, via VMM 1322A) on host 1320A and a VM 1324B (of VMs 1324B1-1324B4, via VMM 1322B) on host 1320B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 13, at least some networks in which embodiments may be implemented may include hardware virtualization technology that enables multiple operating systems to run concurrently on a host computer (e.g., hosts 1320A and 1320B of FIG. 13), i.e. as virtual machines (VMs) 1324 on the hosts 1320. The VMs 1324 may, for example, be executed in slots on the hosts 1320 that are rented or leased to customers of a network provider. A hypervisor, or virtual machine monitor (VMM) 1322, on a host 1320 presents the VMs 1324 on the host with a virtual platform and monitors the execution of the VMs 1324. Each VM 1324 may be provided with one or more local IP addresses; the VMM 1322 on a host 1320 may be aware of the local IP addresses of the VMs 1324 on the host. A mapping service 1330 may be aware of (e.g., via stored mapping information 1332) network IP prefixes and IP addresses of routers or other devices serving IP addresses on the local network. This includes the IP addresses of the VMMs 1322 serving multiple VMs 1324. The mapping service 1330 may be centralized, for example on a server system, or alternatively may be distributed among two or more server systems or other devices on the network. A network may, for example, use the mapping service technology and IP tunneling technology to, for example, route data packets between VMs 1324 on different hosts 1320 within the data center 1300 network; note that an interior gateway protocol (IGP) may be used to exchange routing information within such a local network.

In addition, a network such as the provider data center 1300 network (which is sometimes referred to as an autonomous system (AS)) may use the mapping service technology, IP tunneling technology, and routing service technology to route packets from the VMs 1324 to Internet destinations, and from Internet sources to the VMs 1324. Note that an external gateway protocol (EGP) or border gateway protocol (BGP) is typically used for Internet routing between sources and destinations on the Internet. FIG. 13 shows an example provider data center 1300 implementing a network that provides resource virtualization technology and that provides full Internet access via edge router(s) 1314 that connect to Internet transit providers, according to some embodiments. The provider data center 1300 may, for example, provide customers the ability to implement virtual computing systems (VMs 1324) via a hardware virtualization service and the ability to implement virtualized data stores 1316 on storage resources 1318A-1318N via a storage virtualization service.

The data center 1300 network may implement IP tunneling technology, mapping service technology, and a routing service technology to route traffic to and from virtualized resources, for example to route packets from the VMs 1324 on hosts 1320 in data center 1300 to Internet destinations, and from Internet sources to the VMs 1324. Internet sources and destinations may, for example, include computing systems 1370 connected to the intermediate network 1340 and computing systems 1352 connected to local networks 1350 that connect to the intermediate network 1340 (e.g., via edge router(s) 1314 that connect the network 1350 to Internet transit providers). The provider data center 1300 network may also route packets between resources in data center 1300, for example from a VM 1324 on a host 1320 in data center 1300 to other VMs 1324 on the same host or on other hosts 1320 in data center 1300.

A service provider that provides data center 1300 may also provide additional data center(s) 1360 that include hardware virtualization technology similar to data center 1300 and that may also be connected to intermediate network 1340. Packets may be forwarded from data center 1300 to other data centers 1360, for example from a VM 1324 on a host 1320 in data center 1300 to another VM on another host in another, similar data center 1360, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1318A-1318N, as virtualized resources to customers of a network provider in a similar manner.

Figure 14:
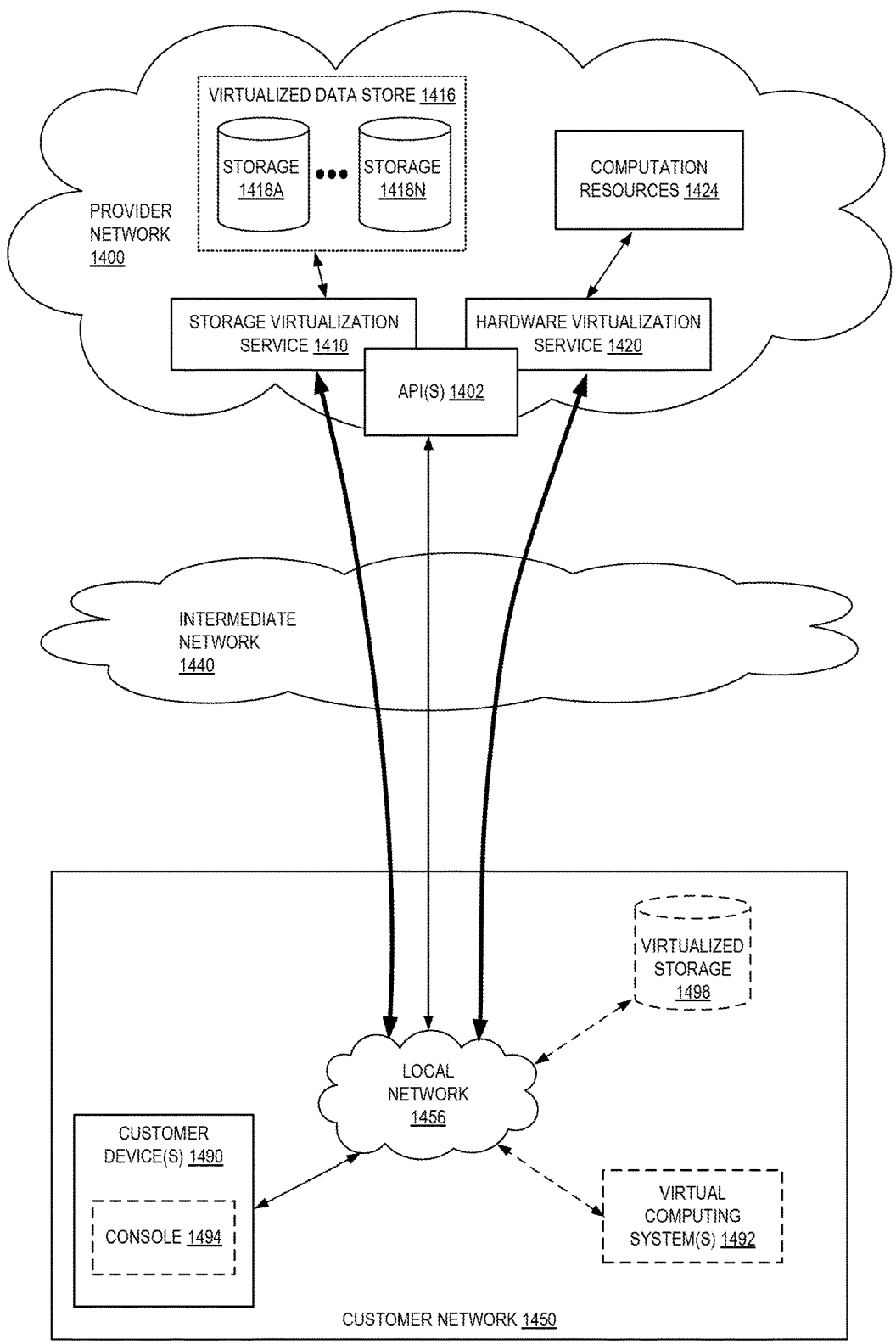
FIG. 14 is a block diagram of an example provider network that provides a storage virtualization service and a hardware virtualization service to customers according to some embodiments.

FIG. 14 is a block diagram of an example provider network that provides a storage virtualization service and a hardware virtualization service to customers, according to some embodiments. Hardware virtualization service 1420 provides multiple computation resources 1424 (e.g., VMs) to customers. The computation resources 1424 may, for example, be rented or leased to customers of the provider network 1400 (e.g., to a customer that implements customer network 1450). Each computation resource 1424 may be provided with one or more local IP addresses. Provider network 1400 may be configured to route packets from the local IP addresses of the computation resources 1424 to public Internet destinations, and from public Internet sources to the local IP addresses of computation resources 1424.

Provider network 1400 may provide a customer network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a customer network 1450 may access functionality provided by the hardware virtualization service 1420, for example via a console 1494 (e.g., a web-based application, standalone application, mobile application, etc.). In some embodiments, at the provider network 1400, each virtual computing system 1492 at customer network 1450 may correspond to a computation resource 1424 that is leased, rented, or otherwise provided to customer network 1450.

From an instance of a virtual computing system 1492 and/or another customer device 1490 (e.g., via console 1494), the customer may access the functionality of storage virtualization service 1410, for example via one or more APIs 1402, to access data from and store data to storage resources 1418A-1418N of a virtual data store 1416 provided by the provider network 1400. In some embodiments, a virtualized data store gateway (not shown) may be provided at the customer network 1450 that may locally cache at least some data, for example frequently accessed or critical data, and that may communicate with virtualized data store service 1410 via one or more communications channels to upload new or modified data from a local cache so that the primary store of data (virtualized data store 1416) is maintained. In some embodiments, a user, via a virtual computing system 1492 and/or on another customer device 1490, may mount and access virtual data store 1416 volumes, which appear to the user as local virtualized storage 1498.

While not shown in FIG. 14, the virtualization service(s) may also be accessed from resource instances within the provider network 1400 via API(s) 1402. For example, a customer, appliance service provider, or other entity may access a virtualization service from within a respective virtual network on the provider network 1400 via an API 1402 to request allocation of one or more resource instances within the virtual network or within another virtual network.

Illustrative System

Figure 15:
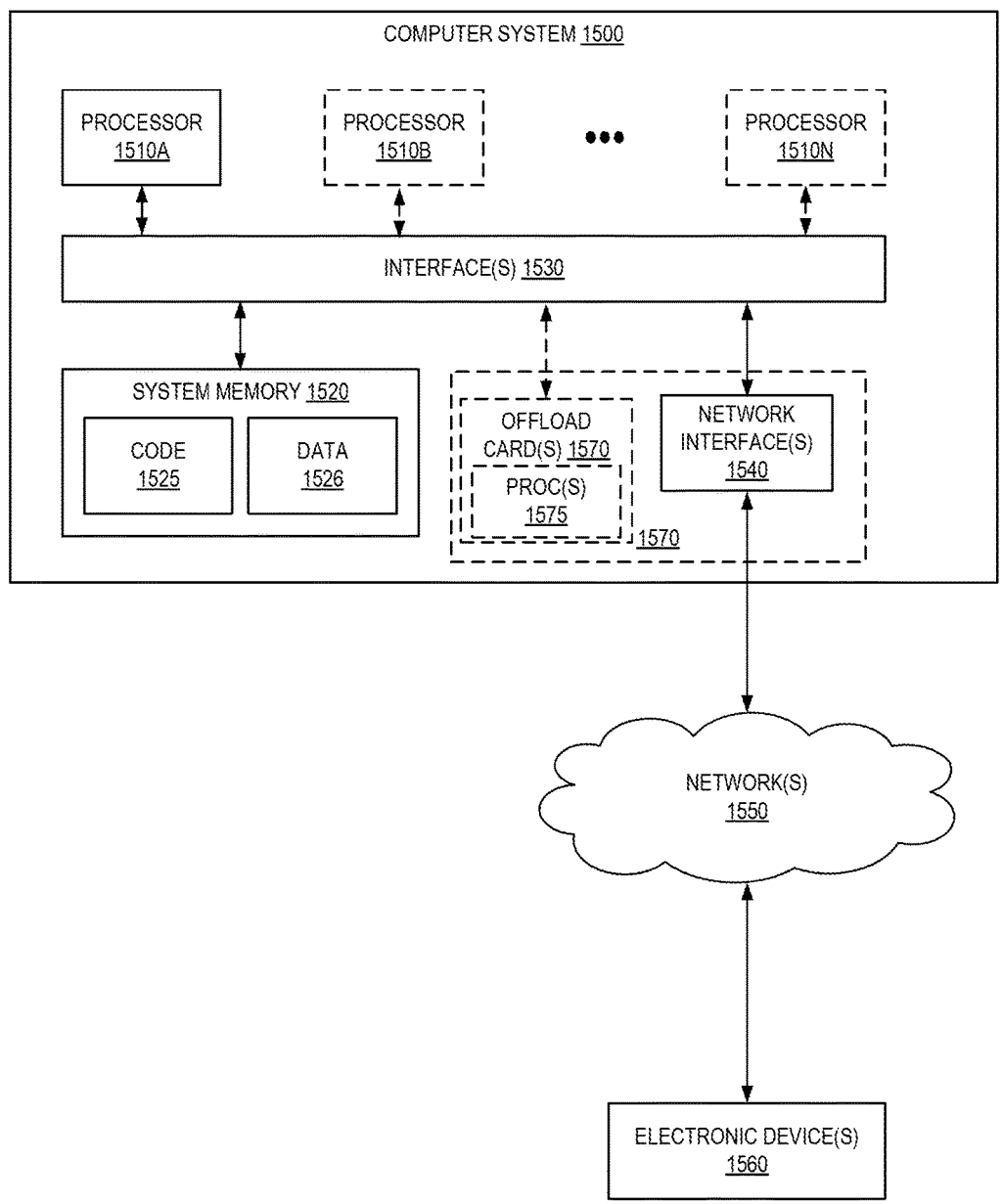
FIG. 15 is a block diagram illustrating an example computer system that may be used in some embodiments.

In some embodiments, a system that implements a portion or all of the techniques for model adaptation as described herein may include a general-purpose computer system that includes or is configured to access one or more computer-accessible media, such as computer system 1500 illustrated in FIG. 15. In the illustrated embodiment, computer system 1500 includes one or more processors 1510 coupled to a system memory 1520 via an input/output (I/O) interface 1530. Computer system 1500 further includes a network interface 1540 coupled to I/O interface 1530. While FIG. 15 shows computer system 1500 as a single computing device, in various embodiments a computer system 1500 may include one computing device or any number of computing devices configured to work together as a single computer system 1500.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1510 may commonly, but not necessarily, implement the same ISA.

System memory 1520 may store instructions and data accessible by processor(s) 1510. In various embodiments, system memory 1520 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1520 as code 1525 and data 1526.

In one embodiment, I/O interface 1530 may be configured to coordinate I/O traffic between processor 1510, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices 1560 attached to a network or networks 1550, such as other computer systems or devices as illustrated in FIG. 1, for example. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1500 includes one or more offload cards 1570 (including one or more processors 1575, and possibly including the one or more network interfaces 1540) that are connected using an I/O interface 1530 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1500 may act as a host electronic device (e.g., operating as part of a hardware virtualization service) that hosts compute instances, and the one or more offload cards 1570 execute a virtualization manager that can manage compute instances that execute on the host electronic device. As an example, in some embodiments the offload card(s) 1570 can perform compute instance management operations such as pausing and/or un-pausing compute instances, launching and/or terminating compute instances, performing memory transfer/copying operations, etc. These management operations may, in some embodiments, be performed by the offload card(s) 1570 in coordination with a hypervisor (e.g., upon a request from a hypervisor) that is executed by the other processors 1510A-1510N of the computer system 1500. However, in some embodiments the virtualization manager implemented by the offload card(s) 1570 can accommodate requests from other entities (e.g., from compute instances themselves), and may not coordinate with (or service) any separate hypervisor.

In some embodiments, system memory 1520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

Figure 16:
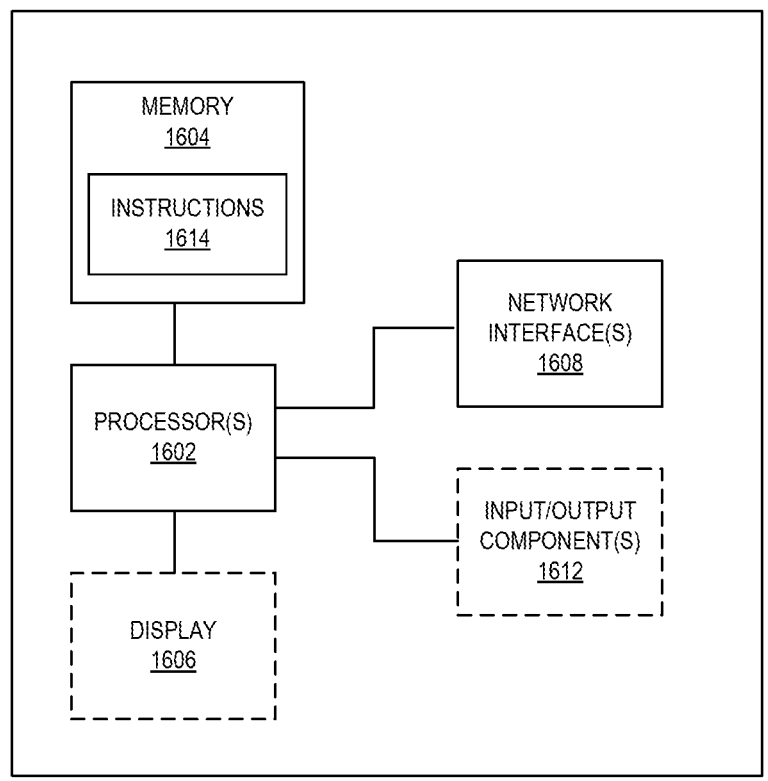
FIG. 16 illustrates a logical arrangement of a set of general components of an exemplary computing device that can be utilized in accordance with various embodiments.

FIG. 16 illustrates a logical arrangement of a set of general components of an example computing device 1600 such as the edge device, web services provider, etc. detailed above. Generally, a computing device 1600 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1602 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1604) to store code (e.g., instructions 1614) and/or data, and a set of one or more wired or wireless network interfaces 1608 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1604) of a given electronic device typically stores code (e.g., instructions 1614) for execution on the set of one or more processors 1602 of that electronic device. One or more parts of various embodiments may be implemented using different combinations of software, firmware, and/or hardware.

A computing device 1600 can include some type of display element 1606, such as a touch screen or liquid crystal display (LCD), although many devices such as portable media players might convey information via other means, such as through audio speakers, and other types of devices such as server end stations may not have a display element 1606 at all. As discussed, some computing devices used in some embodiments include at least one input and/or output component(s) 1612 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 17:
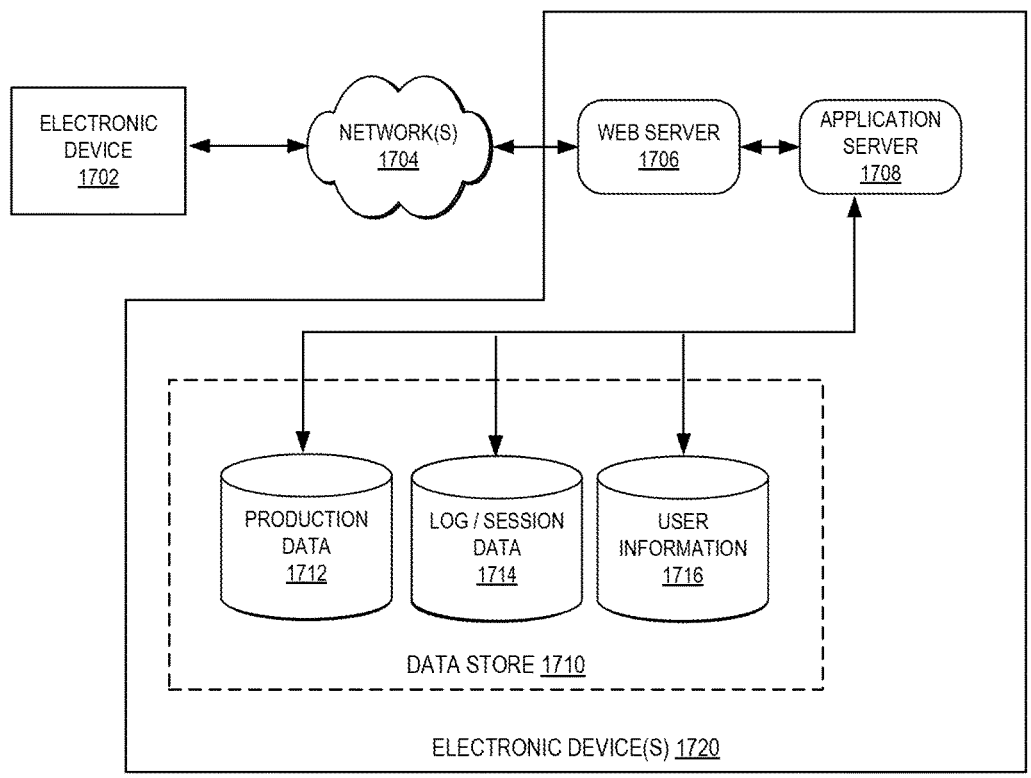
FIG. 17 illustrates an example of an environment for implementing aspects in accordance with various embodiments.

As discussed, different approaches can be implemented in various environments in accordance with the described embodiments. For example, FIG. 17 illustrates an example of an environment 1700 for implementing aspects in accordance with various embodiments. For example, in some embodiments API calls are HyperText Transfer Protocol (HTTP) requests that are received by a web server (e.g., web server 1706), and the users, via electronic devices, may interact with the provider network via a web portal provided via the web server 1706 and application server 1708. As will be appreciated, although a web-based environment is used for purposes of explanation, different environments may be used, as appropriate, to implement various embodiments. The system includes an electronic client device 1702, which may also be referred to as a client device and can be any appropriate device operable to send and receive requests, messages or information over an appropriate network 1704 and convey information back to a user of the device 1702. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1704 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1704 includes the Internet, as the environment includes a web server 1706 for receiving requests and serving content in response thereto, although for other networks an alternative device serving a similar purpose could be used, as would be apparent to one of ordinary skill in the art.

The illustrative environment includes at least one application server 1708 and a data store 1710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1708 can include any appropriate hardware and software for integrating with the data store 1710 as needed to execute aspects of one or more applications for the client device 1702 and handling a majority of the data access and business logic for an application. The application server 1708 provides access control services in cooperation with the data store 1710 and is able to generate content such as text, graphics, audio, video, etc., to be transferred to the client device 1702, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1702 and the application server 1708, can be handled by the web server 1706. It should be understood that the web server 1706 and application server 1708 are not required and are merely example components, as structured code discussed herein can be executed on any appropriate device or host machine as discussed elsewhere herein.

The data store 1710 can include several separate data tables, databases, or other data storage mechanisms and media for storing data relating to a particular aspect. For example, the data store illustrated includes mechanisms for storing production data 1712 and user information 1716, which can be used to serve content for the production side. The data store 1710 also is shown to include a mechanism for storing log or session data 1714. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update, or otherwise process data in response thereto. In one example, a user might submit a search request for a certain type of item. In this case, the data store 1710 might access the user information 1716 to verify the identity of the user and can access a production data 1712 to obtain information about items of that type. The information can then be returned to the user, such as in a listing of results on a web page that the user is able to view via a browser on the user device 1702. Information for a particular item of interest can be viewed in a dedicated page or window of the browser.

The web server 1706, application server 1708, and/or data store 1710 may be implemented by one or more electronic devices 1720, which can also be referred to as electronic server devices or server end stations, and may or may not be located in different geographic locations. Each of the one or more electronic devices 1720 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the environment 1700 in FIG. 17 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a first application programming interface (API) request to analyze a stored video, the API request to include a location of the stored video and at least one analysis action to perform on the stored video;
   placing the request into a queue;
   polling the queue to retrieve the request;
   accessing the location of the stored video to retrieve the stored video;
   segmenting the accessed video into chunks;
   processing each chunk with a chunk processor to perform the at least one analysis action, each chunk processor to utilize at least one machine learning model in performing the at least one analysis action;
   joining the results of the processing of each chunk to generate a final result;
   storing the final result; and
   providing the final result to a requestor in response to a second API request.

2. The computer-implemented method of claim 1, wherein first API request is one of a start content moderation request to perform an analysis of content of the stored video, a start face detection request to perform face detection in the stored video, a start label detection request to perform label detection in the stored video, a start person tracking request to perform person tracking in the stored video, and a start celebrity recognition request to perform celebrity detection in the stored video.

3. The computer-implemented method of claim 1, wherein the chunk processor includes a chunk decoder to generate chunk frames that are passed to at least one machine learning algorithm to perform the at least one analysis.

4. A computer-implemented method comprising:
   receiving a first application programming interface (API) request to analyze a stored video, the API request to include a location of the stored video and at least one analysis action to perform on the stored video;

accessing the location of the stored video to retrieve the stored video;

segmenting the accessed video into chunks;

processing each chunk with a chunk processor to perform the at least one analysis action, each chunk processor to utilize at least one machine learning model in performing the at least one analysis action;

joining the results of the processing of each chunk to generate a final result;

storing the final result; and providing the final result to a requestor in response to a second API request.

5. The computer-implemented method of claim 4, wherein first API request is one of a start content moderation request to perform an analysis of content of the stored video, a start face detection request to perform face detection in the stored video, a start label detection request to perform label detection in the stored video, a start person tracking request to perform person tracking in the stored video, and a start celebrity recognition request to perform celebrity detection in the stored video.

6. The computer-implemented method of claim 4, wherein the chunk processor includes a chunk decoder to generate chunk frames that are passed to at least one machine learning algorithm to perform the at least one analysis.

7. The computer-implemented method of claim 6, wherein the least one machine learning algorithm of the chunk processor is a face detection algorithm.

8. The computer-implemented method of claim 6, wherein the least one machine learning algorithm of the chunk processor is a label detection algorithm.

9. The computer-implemented method of claim 4, wherein the joining of the results of the processing of each chunk to generate a final result is performed by an aggregator and the final result includes at least one of a per frame person bounding box, face bounding box, and a face match.

10. The computer-implemented method of claim 4, wherein the first API request is received by a front end of a video analysis service.

11. The computer-implemented method of claim 4, wherein the stored video is generated by capturing and indexing streaming video.

12. The computer-implemented method of claim 4, wherein the stored video is encrypted and is protected from unauthorized access.

13. The computer-implemented method of claim 4, further comprising:

notifying a requestor that the final result is available.

14. A system comprising:

an end user device to send a first request for analysis of stored video;

a web services provider to:

receive the request to analyze a stored video, the first request to include a location of the stored video and at least one analysis action to perform on the stored video;

access the location of the stored video to retrieve the stored video;

segment the accessed video into chunks;

process each chunk with a chunk processor to perform the at least one analysis action, each chunk processor to utilize at least one machine learning model in performing the at least one analysis action;

join the results of the processing of each chunk to generate a final result;

store the final result; and provide the final result to a requestor in response to a second API request.

15. The system of claim 14, wherein first request is one of a start content moderation request to perform an analysis of content of the stored video, a start face detection request to perform face detection in the stored video, a start label detection request to perform label detection in the stored video, a start person tracking request to perform person tracking in the stored video, and a start celebrity recognition request to perform celebrity detection in the stored video.

16. The system of claim 14, wherein the chunk processor is to include a chunk decoder to generate chunk frames that are passed to at least one machine learning algorithm to perform the at least one analysis.

17. The system of claim 16, wherein the least one machine learning algorithm of the chunk processor is a face detection algorithm.

18. The system of claim 16, wherein the least one machine learning algorithm of the chunk processor is a label detection algorithm.

19. The system of claim 14, wherein the joining of the results of the processing of each chunk to generate a final result is performed by an aggregator and the final result includes at least one of a per frame person bounding box, face bounding box, and a face match.

20. The system of claim 14, wherein the first request is received by a front end of the web services provider.

* * * * *